United States Patent [19]
Weber et al.

[11] 3,977,791
[45] Aug. 31, 1976

[54] METHOD OF RECOGNITION AND INTERPRETATION OF OBJECTS IN MICROSCOPIC OBSERVATIONS

[75] Inventors: Klaus Weber, Konigsbronn; Lothar Trapp, Heidenheim (Brenz); Günther Kleinmaier, Aalen, all of Germany

[73] Assignee: Carl Zeiss-Stiftung, Oberkochen, Germany

[22] Filed: Feb. 10, 1975

[21] Appl. No.: 548,670

[30] Foreign Application Priority Data
Feb. 15, 1974 Germany............................ 2434246

[52] U.S. Cl................................ 356/168; 356/166
[51] Int. Cl.².......................................... G01B 11/24
[58] Field of Search ............ 356/168, 171, 166, 165

[56] References Cited
UNITED STATES PATENTS
2,790,347  4/1957  Link et al. .......................... 356/168
3,565,534  2/1971  Chaban................................ 356/168
3,580,682  5/1971  Iliescu et al........................ 356/168

FOREIGN PATENTS OR APPLICATIONS
214,091  5/1968  U.S.S.R............................... 356/171

Primary Examiner—John K. Corbin
Assistant Examiner—Wm. H. Punter
Attorney, Agent, or Firm—Nichol M. Sandoe

[57] ABSTRACT

The invention contemplates a method of microscopic analysis of biological, metallurgical or other specimens, wherein an image copy of a comparison or reference object is used to produce a comparison image in the image plane of the microscope eyepiece. A direct side-by-side comparison can then be made for the unknown or unclassified specimen, against the image copy, which may be two adjacent image copies, displayed alongside the unknown, to enable a judgment as to the resemblance between the unknown and one or the other of the two image copies.

10 Claims, 1 Drawing Figure

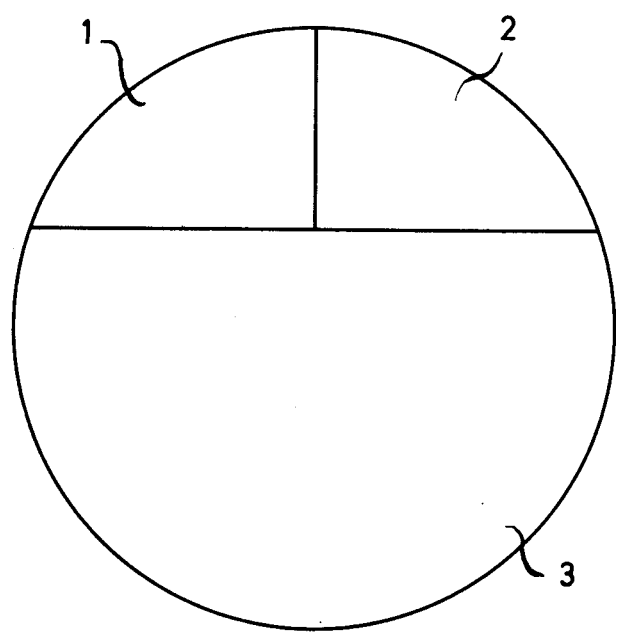

METHOD OF RECOGNITION AND INTERPRETATION OF OBJECTS IN MICROSCOPIC OBSERVATIONS

This invention relates to a method of recognition and interpretation of objects in microscopic observations.

In a plurality of methods using microscopic observation of objects, it is important to correctly recognize and associate the observed objects. By way of example, reference is made to metallurgical analysis, particularly structural image comparison, to the investigation of rock grindings, and to fibre comparison. In the medical area, reference is made in particular to cellular and blood-image differentiation and more particularly to fluorescent immunological methods.

All these methods are beset with the difficulty of correctly associating an observed object, in order to draw the correct conclusion from the observed image. The attempt has been made to use a positively defined comparison object and to observe the same in alternation with the object to be evaluated. This method is not only very circumstantial, but it also does not lead to safe or reliable results.

Special comparison microscopes are already known which enable the simultaneous observation of two objects. Such special microscopes are, however, awkward to use and also involve unduly large apparatus.

It is, therefore, an object of the present invention to provide an improved method of recognition and interpretation of objects in microscopic observations, which method can be carried out as a routine procedure, regardless of location and without requiring highly skilled or highly trained personnel.

Another object is to meet the foregoing object with a method which can be performed easily, and readily, leading to safe and reliable results, while using relatively simple apparatus to carry out the method.

The accompanying drawing is a simplified showing of a displayed microscope field of view, in an illustrative use of the invention.

Briefly stated, the invention contemplates an improved method in which both a microscopically produced object image and a comparison image are concurrently visible, and the improved method is particularly characterized by the fact that at least one image copy (representing the comparison or reference object) is used for producing the comparison image in the image plane of the microscope eyepiece. An image copy makes it possible to use particularly instructive comparison images and to so standardize the particular method of observation that results from different laboratories can be compared with each other. Moreover, very good copies can be produced in great number and at low cost from a given selected image copy.

In the novel method, the comparison image is produced in the image plane of the microscope eyepiece, i.e., the observer observes the comparison and object images at the same time and directly adjacent to each other in the field of view, thus enabling reliable comparisons and interpretations. The method is simple and substantially precludes possibilities of error.

The image copy is expediently obtained by microphotography, and it is advantageous to have it designed as a slide. This makes it possible to use a standard, commercially available fluorescence microscope with little additional means. By way of example, such additional means is described in German Patent Application P 24 07 270.6—51, filed Feb. 15, 1974, being also the subject of a U.S. application, Ser. No. 548,672 filed on even date herewith; reference is made to said application for detail of microscope structure. In said application, the comparison image copy is imaged into the image plane of the microscope eyepiece via the back side of the reflector used for reflecting the illuminating beam. It is also possible to image the comparison via a special beam splitter or via the beam splitter of a binocular body. A further possibility of producing the comparison image consists in covering a portion of the image field on the illumination side with a fully reflecting mirror and therewith image the comparison image.

An important application of the novel method is in the field of immunological fluorescence microscopy in which, for instance, the presence or absence of antibodies in sera to be analyzed is determined. To this end, the serum is applied to pre-prepared viri (antigenes). After addition of marked antiglobulin, microscopy is carried out, and in the positive case, i.e., if the serum contains the specific antibodies and consequently an infection is existing, fluorescence occurs on the antigene diaphragm.

In current practice of immunological fluorescence microscopy, positive and negative control sera are introduced into the analysis and are observed in alternation with the samples produced by means of the serum to be analyzed. It is obvious that the results thus obtained are uncertain and can therefore not be compared with results from other laboratories. For this among other reasons, immunological fluorescence microscopy has to date found little routine application in clinical laboratories.

However, the method of the present invention makes it possible to now offer diagnostic immunological fluorescence tests which are inexpensive and uncomplicated to apply. A set for performing such a test includes all substances and materials necessary for carrying out the test, as well as several comparison images in the form of slides. Such test sets can be had for different antigenes. To name but a few of many possible examples: *Rickettsia prowazeki* (spotted fever), *salmonella typhi* (*typhus abodominalis*), streptococci (feverish infection), *influenze viri*, polioviri (poliomyalitis) and *toxoplasma gondii* (toxoplasmosis). By way of example, an investigation as to toxoplasmosis is described in connection with the accompanying drawing; toxoplasmosis is an infectious disease which may lead to complications, primarily where elderly people and pregnant women are involved.

To use the novel method in a test for toxoplasmosis, first a dilution series is produced from the patient's serum. Object carriers with toxoplasma gondii as antigene prepared and contained in the test are coated with one drop each of every dilution and incubated approximately 30 minutes at 98.6°F. Subsequently, the object carriers are rinsed with a buffer solution contained in the test set in order to remove superfluous serum. The next step is to apply a drop of fluorochromium antihuman globulin solution present in the test set on every swab. Finally, the next step is to incubate again and subsequently to rinse with a buffer solution in order to remove excessive antihuman globulin.

In the case of an infection, the immunological system of the patient under examination has formed antibodies which are contained in the serum. These antibodies are bound to the antigene in the described test and are made visible by the addition of the antihuman globulin in the fluorescence microscope.

The prepared object carriers can be microscopically investigated with or without cover glass, as well as with or without immersion. Together with an object carrier a slide is introduced into the fluorescence microscope which at least shows one selected comparison image. The field of view of the microscope is divided into two parts as shown in the accompanying FIG. A portion, for instance one third of the field of view, is provided for the imaged reference image, shown split into two halves 1 and 2; one half shows a negative reaction, while the other half shows a medium-strength reaction. The other portion of the field of view is provided for the image 3 of the original object carrier to be examined. The original image of the toxoplasmen present on the object carrier is now compared with the reference image and evaluated, in the context of the respective reference images.

The comparison of the imaged image with the original image prevents the non-recognition of a false antigene, artifacts, or foreign bodies on the object carrier as such, which might otherwise lead to a false interpretation of the test.

The indirect immunological fluorescence method herein described permits quantitative titration of sera. In the test, it is determined up to which dilution a serum still shows a positive reaction. This dilution is representative of the relative antibody concentration and enables indication as to the gravity and course of the infection.

With increasing dilution of the serum, the fluorescence weakens continuously until only red-contrast fluorescence is still visible. But the constant possibility of comparing original-image fluroescence with the imaged image substantially facilitates the evaluation, while simplifying and safeguarding the end-point determination.

It will be understood that the described use of the imaged comparison image also enables recognition of unspecific fluoroescence, for instance, polar fluorescence, thus avoiding an interpretation of falsely positive results.

It should also be mentioned that the described microscopic evaluation can be carried out in transmitted light and/or in incident light.

It addition to the immunological fluorescence method herein described by way of example, the novel method can also be applied advantageously in the differentiation of objects, for instance, in cellular or blood-image differentiation. Using the imaged reference image, a safe judgment of the image to be examined is also possible herein. Thus, for instance, it can be decided with sufficient safety and positive assurance whether a cell is or is not degenerated.

What is claimed is:

1. In the immunological-fluorescence method of using a microscopic to investigate a prepared object carrier, the improvement which comprises using micro-photographic images of two different preselected-strength reactions to produce in the field of view of said microscope two reference images at the same time and directly adjacent the microscopically produced object image.

2. The method as claimed in claim 1, in which each of said micro-photographic images is on a slide.

3. The method as claimed in claim 1, in which both of said micro-photographic images are on separate areas of the same slide.

4. The method as claimed in claim 1, in which said images are produced directly adjacent each other in the field of view of said microscope.

5. The method as claimed in claim 1, in which the reference images are produced directly adjacent the microscopically produced object image.

6. The method as claimed in claim 1, in which the reference image covers a smaller portion of the field of view than that of the object image.

7. The method as claimed in claim 1, in which one of the reference images shows a negative reaction, and the other reference image shows a medium reaction.

8. The method as claimed in claim 1, in which the two different reference images are produced adjacent each other.

9. The method as claimed in claim 1 in specific application to cellular differentiation.

10. The method as claimed in claim 9, in which the cellular differentiation is blood-image differentiation.

* * * * *